US012728706B2

(12) United States Patent
Moore

(10) Patent No.: US 12,728,706 B2
(45) Date of Patent: Sep. 8, 2026

(54) RETRACTABLE SCREEN FOR A VEHICLE WINDOW

(71) Applicant: Bernard Moore, Greensboro, NC (US)

(72) Inventor: Bernard Moore, Greensboro, NC (US)

( * ) Notice: Subject to any disclaimer, the term of this patent is extended or adjusted under 35 U.S.C. 154(b) by 318 days.

(21) Appl. No.: 18/425,084

(22) Filed: Jan. 29, 2024

(65) Prior Publication Data

US 2025/0242669 A1 Jul. 31, 2025

(51) Int. Cl.
*B60J 1/20* (2006.01)

(52) U.S. Cl.
CPC ........... *B60J 1/2086* (2013.01); *B60J 1/2061* (2013.01)

(58) Field of Classification Search
CPC ........ B60J 1/2011; B60J 1/2013; B60J 1/203; B60J 1/2033; B60J 1/2041; B60J 1/2063; B60J 1/2086; E06B 9/54
See application file for complete search history.

(56) References Cited

U.S. PATENT DOCUMENTS

| | | | |
|---|---|---|---|
| 1,538,777 A | 5/1925 | Zeman et al. | |
| 2,528,786 A | 11/1950 | Roberts | |
| 2,760,568 A | 8/1956 | Smiraldo | |
| 2,768,682 A | 10/1956 | Smiraldo | |
| 4,285,383 A | 8/1981 | Steenburgh | |
| 4,398,586 A | 8/1983 | Hall | |
| 5,947,544 A | 9/1999 | Hubeshi | |
| 6,367,536 B1 | 4/2002 | St Louis | |
| 6,460,593 B1 | 10/2002 | Floyd | |
| 6,547,307 B2 | 4/2003 | Schlecht et al. | |
| 6,681,832 B1 | 1/2004 | Procida et al. | |
| 6,848,493 B1 | 2/2005 | Hansen et al. | |
| 7,396,067 B2 | 7/2008 | Thumm et al. | |
| 8,397,788 B2 | 3/2013 | Weinbrenner et al. | |
| 9,358,861 B2 | 6/2016 | Rockelmann et al. | |
| 9,387,748 B2 | 7/2016 | Sawada | |
| 2001/0017194 A1 | 8/2001 | Schlecht et al. | |
| 2002/0033244 A1 | 3/2002 | Schlecht et al. | |
| 2016/0129765 A1* | 5/2016 | Taad | B60J 1/2063 160/311 |
| 2018/0334016 A1 | 11/2018 | Matthews | |
| 2019/0168585 A1 | 6/2019 | Callaghan | |

FOREIGN PATENT DOCUMENTS

| | | | |
|---|---|---|---|
| CN | 105421980 A * | 3/2016 | E06B 9/40 |

OTHER PUBLICATIONS

PE2E English Translation of CN-105421980-A (Year: 2016).*

* cited by examiner

*Primary Examiner* — Nicholas McFall
*Assistant Examiner* — Eric Acosta
(74) *Attorney, Agent, or Firm* — COATS & BENNETT, PLLC

(57) ABSTRACT

A screen system for use in a window of a vehicle. The screen system includes a screen, a spool mounted to a leading edge of the screen, a housing configured to be mounted at a first edge of the window, and one or more bands that are operatively connected to the screen and configured to apply a biasing force to the screen. The screen is movable between a retracted position and an extended position. The retracted position includes the screen rolled onto the spool and with the screen and the spool positioned in the housing at the first edge of the window. The extended position includes the screen extending across the window.

18 Claims, 8 Drawing Sheets

RETRACTABLE SCREEN FOR A VEHICLE WINDOW

TECHNICAL FIELD

The present application is directed to a screen and, more specifically, to a screen configured to fit within a window of a vehicle and be selectively positioned in the window.

BACKGROUND

It is often desired to ride in a vehicle with a window open. Fresh air is directed into a window as the vehicle moves along the road. Window screens have been used to be positioned in the window and allow the passage of air while preventing debris such as insects from entering into the vehicle. However, existing window screens for vehicles have a variety of drawbacks.

One issue with existing vehicle screens is the gaps that are formed between the window frame and the screen. The gaps allow for debris to enter into the vehicle even when the screen is deployed. The gaps can vary in size from relatively small such as just a corner of the window being open, to relatively large such as along an upper section of the window, or along a forward section of the window. The larger the gap the more likely for debris to enter into the vehicle. The aerodynamics of the screen within the window can also cause the debris to be directed into the gap and into the vehicle interior.

Another issue is the difficulty in using existing vehicle screens. Many of the window screens are difficult to mount into the window. The vehicle screens often do not fit the window thus making it difficult to adequately mount the screen in the window frame. If the screen is not correctly mounted, it can fall out of the window, particularly when the vehicle is moving and the force of the air is striking against the screen. The difficulty in mounting the screen can often frustrate a user resulting in the screen not being used in the window.

SUMMARY

One aspect is directed to a screen system for use in a window of a vehicle. The screen system comprises a screen comprising a leading edge and a trailing edge, a spool mounted to the leading edge of the screen, a housing configured to be mounted at a first edge of the window, and one or more bands that are operatively connected to the screen and configured to apply a biasing force to the screen, the one or more bands being elastic. The screen is movable between a retracted position and an extended position. The retracted position comprises the screen rolled onto the spool with the screen and the spool positioned in the housing at the first edge of the window. The extended position comprises the screen extending across the window with the leading edge positioned at a second edge of the window and the first edge positioned at the first edge of the window and with the one or more bands extending across the window and applying the biasing force to the screen.

In another aspect, the one or more bands comprise a first end that is connected to the housing and a second end that is connected to the spool.

In another aspect, the one or more bands are wrapped around the spool when the screen is in the retracted position.

In another aspect, the second end of the one or more bands are connected to track members that are mounted to the ends of the spool.

In another aspect, a first one of the bands is positioned at an upper edge of the screen and a second one of the bands is positioned at a lower edge of the screen.

In another aspect, the spool comprises an inner member, an outer member that extends around the inner member and a biasing member that applies a biasing force that forces the inner member and outer member apart and wherein the inner member and the outer member are telescopingly engaged.

In another aspect, the spool comprises track members mounted to the ends with the track members comprising rollers configured to engage with a frame of the window.

In another aspect, the one or more bands are connected to the track members.

In another aspect, a mount is configured to be mounted at the second edge of the window with the spool configured to connect to the mount in the extended position to maintain the screen positioned across the window.

One aspect is directed to a method of using a screen system with a window of a vehicle. The method comprises: mounting a trailing edge of the screen to a first edge of the window; applying a force to the screen and overcoming a biasing force applied by one or more bands and moving a leading edge of the screen across the window with the trailing edge remaining mounted to the first edge of the window; extending the screen across the window and securing the leading edge of the screen to the second edge of the window; and extending the one or more bands across the window from the first edge of the window to the second edge of the window and applying a biasing force to the screen to bias the screen towards the first edge of the window.

In another aspect, the method further comprises increasing the biasing force applied by the one or more bands as the leading edge moves across the window towards the second edge of the window.

In another aspect, the method further comprises mounting the trailing edge of the screen to a housing that is mounted at the first edge of the window.

In another aspect, the method further comprises unrolling the screen from a scroll that is attached to the leading edge of the screen while moving the leading edge across the window towards the second edge.

In another aspect, the method further comprises contacting outer ends of a scroll against opposing sides of the window while moving the leading edge of the screen across the window with the scroll attached to the leading edge of the screen.

In another aspect, the method further comprises reducing a length of the scroll while moving the scroll across the window towards the second edge of the window.

In another aspect, the method further comprises securing the leading edge of the screen to the second edge of the window and filling the entire window with the screen.

One aspect is directed to a method of using a screen system with a window of a vehicle. The method comprises: positioning one or more bands in a housing that is mounted to a first edge of the window with the one or more bands connected to a spool; extending the one or more bands from the housing to a spool that supports a screen while moving the spool and the screen across the window; applying a biasing force to the spool while moving the spool and the screen across the window with the biasing force pulling the spool and the screen towards the housing; securing the leading edge of the screen to the second edge of the window while the one or more bands are applying the biasing force to the spool; and extending the one or more bands across the window from the first edge of the window to the second edge of the window while the leading edge of the screen is secured to the second edge of the window.

In another aspect, the method further comprises unrolling the one or more bands from around the spool while moving the spool across the window.

In another aspect, the method further comprises positioning spool in an end housing at the second edge of the window and thereby securing the leading edge of the screen to the second edge of the window.

In another aspect, the method further comprises reducing a height of the spool while moving the spool across the window.

The various aspects of the various embodiments may be used alone or in any combination, as is desired.

DETAILED DESCRIPTION

Figure 1:
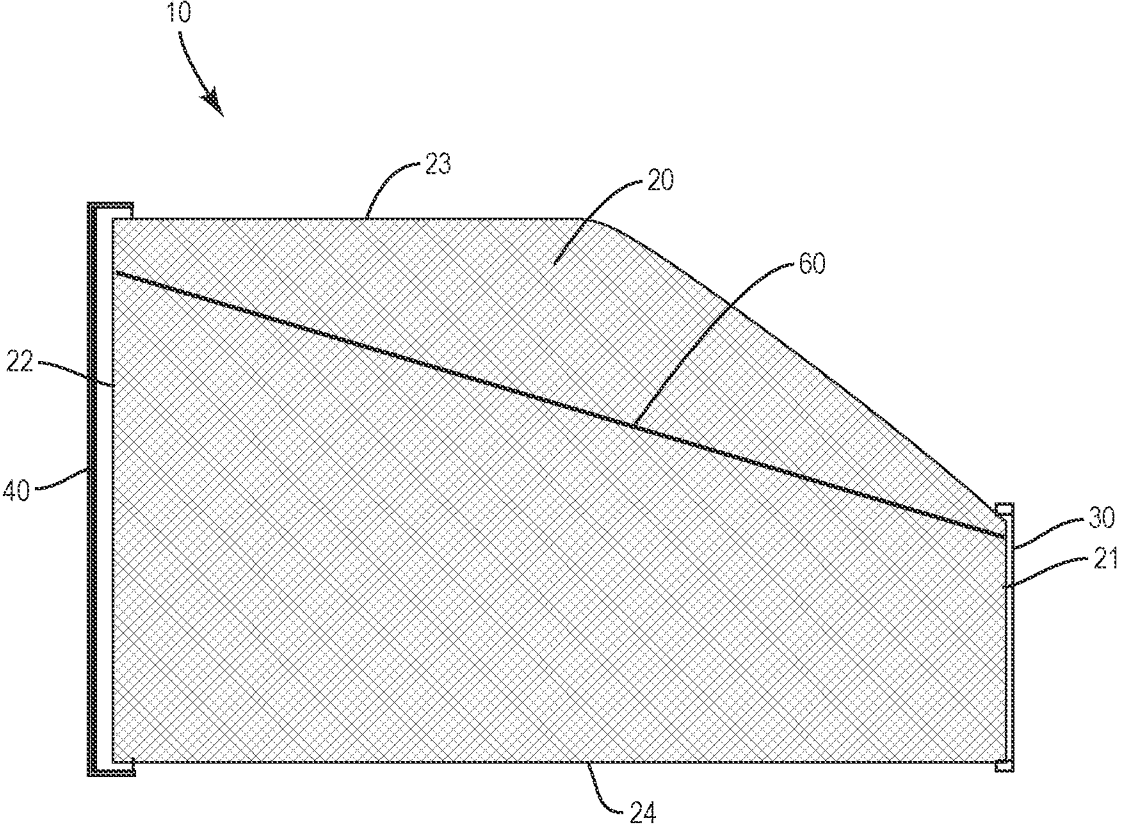
FIG. 1 is a schematic side view of a screen in an extended position.

The present application is directed to a screen system configured to be positioned across a window of a vehicle. The screen system includes a screen that is movable between a retracted position and an extended position. FIG. 1 illustrates an example of a screen system 10 in an extended position. The screen system 10 includes a screen 20 sized to extend across the window. A spool 30 supports the screen 20 when moving between the retracted and extended positions. A housing 40 is mounted at the window and receives the screen 20 in the retracted position.

The screen 20 is constructed from a material that blocks debris such as insects and leaves while allowing air to pass. The screen 20 can be constructed from a variety of different materials including but not limited to fiberglass and polyester. The screen can include various mesh sizes. Examples include but are not limited to 18×16, and 20×20. The screen 20 has a construction to be strong enough to keep debris out of the vehicle, sturdy such that it will not sag when extending across the window frame, tear resistant, and resistant to creasing. The screen 20 is further flexible to be rolled onto the spool 30 in the retracted position, and to be unrolled in a flat configuration in the extended position.

The screen 20 has a leading edge 21 and a trailing edge 22. In some examples, the leading edge 21 is connected to the spool 30 and the trailing edge 22 is connected to the housing 40. The screen 20 also includes an upper edge 23 and a lower edge 24. The screen 20 can include various shapes and sizes. In one example, the screen 20 is sized to conform to the window opening. In other examples, the screen 20 has a different shape and/or size than the window opening.

Figures 2A, 2B:
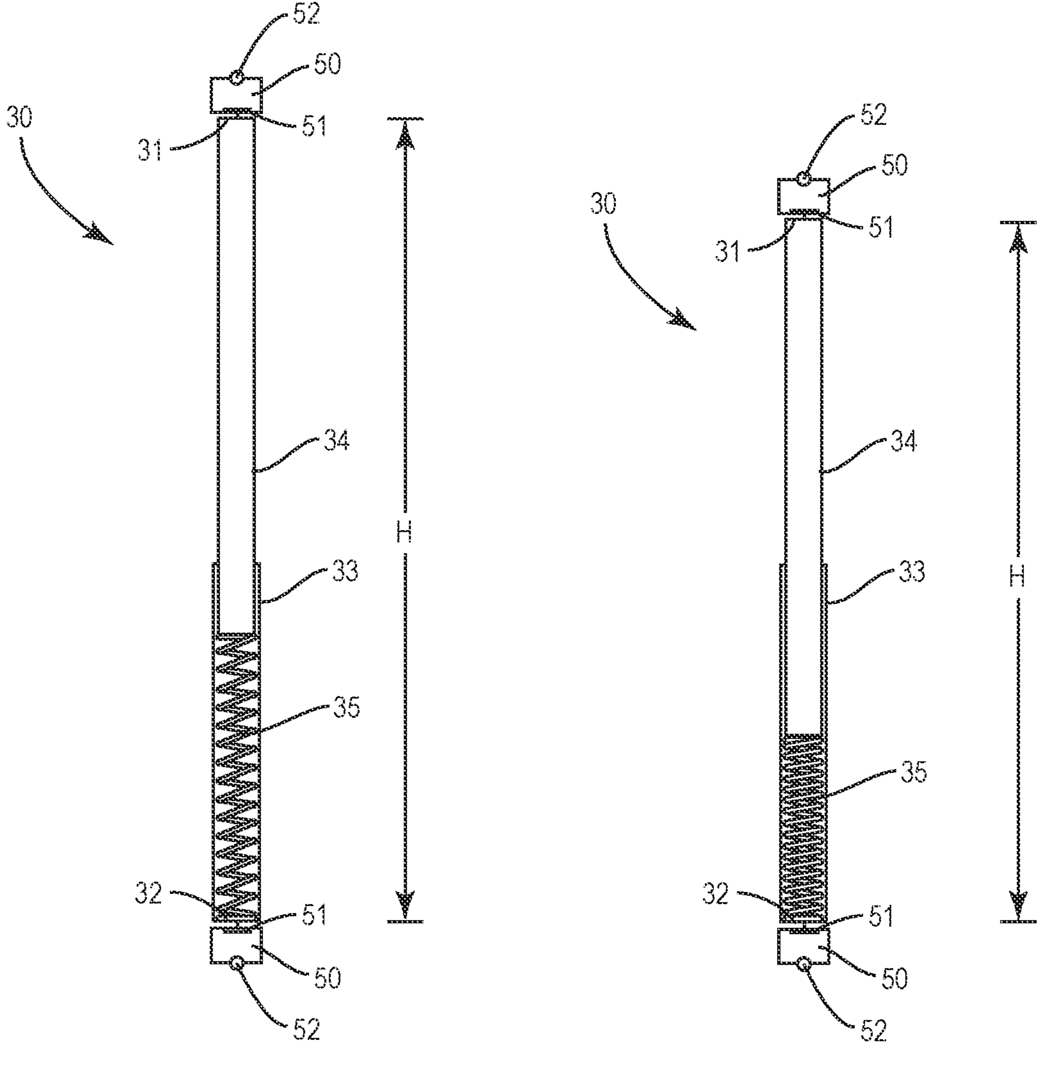
FIG. 2A is a schematic diagram of a spool having an inner member and an outer member.
FIG. 2B is the spool of FIG. 2A in a reduced sized with the inner member inserted a greater amount into the outer member.

The spool 30 provides a structure for supporting the leading edge 21 of the screen 20. The spool 30 also forms a handle for grasping by a user to move the screen 20 between the extended and retracted positions. In some examples, the spool 30 also provides a core for rolling the screen 20 in the retracted position. As illustrated in FIGS. 2A and 2B, the spool 30 includes a height H measured between top end 31 and a bottom end 32. In some examples, the screen 20 is wrapped around the spool 30. The spool 30 is shaped for the screen 20 to wrap around without creasing or otherwise damaging the screen 20. Examples of sectional shapes include but are not limited to circular and oval.

In some examples, the spool 30 is a single member. In other examples as illustrated in FIGS. 2A and 2B, the spool 30 includes a telescoping configuration that includes an outer member 33 and an inner member 34. The outer member 33 includes a hollow interior that is sized to receive the inner member 34. A spring 35 is positioned within the hollow interior of the outer member 33 and biases the members 33, 34 apart. In some examples, the outer member 33 and inner member 34 include flanges that contact to control an extent of relative movement and maintain the members 33, 34 connected.

Track members 50 are mounted to one or both of the top end 31 and bottom end 32. The track member 50 is configured to engage with the window frame when the screen 20 is moved between the retracted and extended positions. In some examples as illustrated in FIGS. 2A and 2B, the track members 50 are attached by connectors 51 that allow for the spool 30 to rotate relative to the track members 50. In some examples, the connectors 51 include an arm with flanges on each side that connect respectively to the track member 50 and the spool 30. In another example, the connectors 51 comprise a bearing with inner and outer races.

The track member 50 includes one or more rollers 52 that are exposed on the exterior. The rollers 52 have a spherical shape that provide for contacting against the window frame and facilitate movement of the track member 50. In one example, the connectors 51 are ball bearings that are rotatably mounted to the track member 50.

Figure 3:
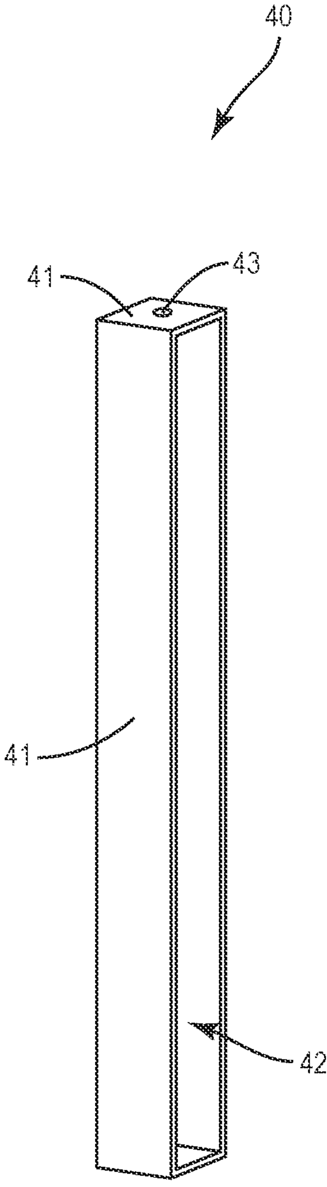
FIG. 3 is a perspective view of housing.

The housing 40 receives the screen 20 and spool 30 in the retracted position. As illustrated in FIG. 3, the housing 40 includes outer walls 41 that extend around and form a receptacle 42. In one example as illustrated, the housing 40 includes upper and lower outer walls 41, and three lateral outer walls 41. The receptacle 42 includes an open side to receive the screen 20 and spool 30. Mounts 43 are configured to engage with the vehicle and position the housing 40 in proximity to the window opening. In some examples, the mounts 43 includes a spring-biased peg that can be retracted to apply a force and be secured to the vehicle. In another example, the mounts 43 include clips that provide for connecting with the vehicle.

Figure 4:
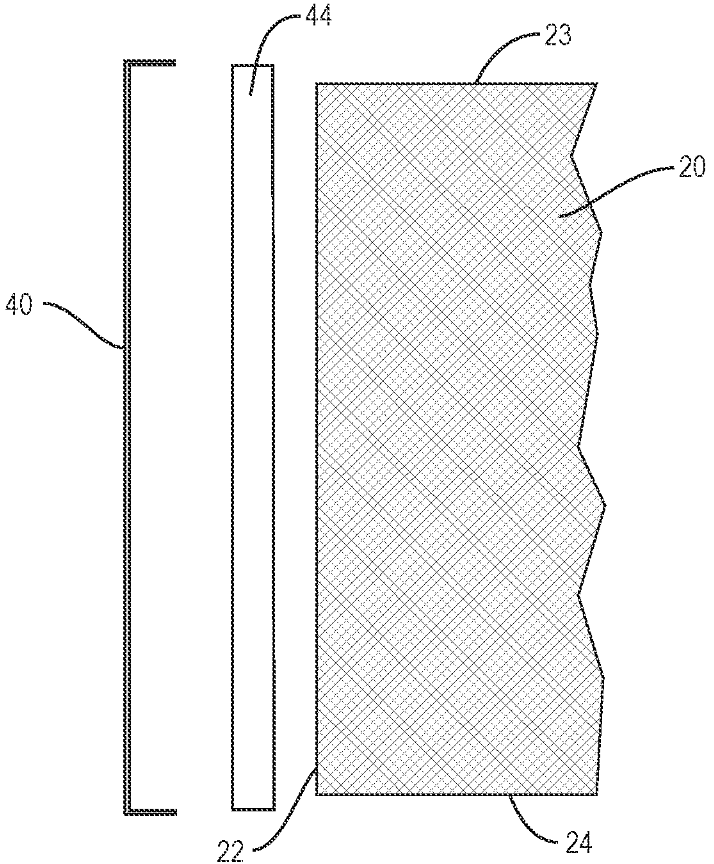
FIG. 4 is an exploded schematic diagram of a spool configured to be mounted in a housing and be mounted to a screen.

In some examples, the trailing edge 22 of the screen 20 is secured to the housing 40. This provides for the screen 20 to remain engaged with the housing 40. In one example, the trailing edge 22 is secured by one or more fasteners. In one specific example, fasteners connect the trailing edge 22 to one or more of the outer walls 41. In another example as schematically illustrated in FIG. 4, a spool 44 is rotatably mounted in the housing 40. The trailing edge 22 is mounted to the spool 44 and the screen 20 is wrapped around the spool 44 in the retracted position. The spool 44 rotates to enable the screen 20 to move between the extended and retracted positions.

Figure 5:
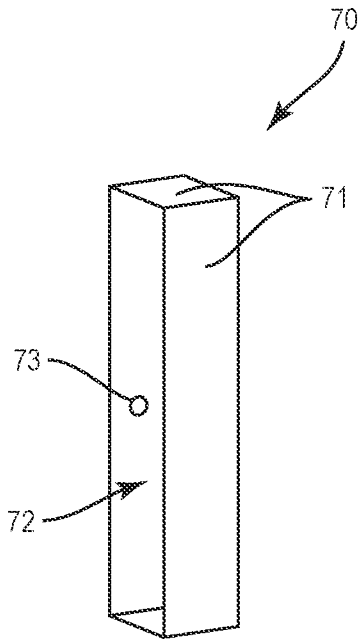
FIG. 5 is a perspective view of a mount to receive the leading edge of the screen in the extended position.

In some examples as illustrated in FIG. 5, a mount 70 is mounted at the opposing side of the window to receive the spool 30 and leading edge 21 of the screen 20 in the extended position. The mount 70 includes a receptacle 72 sized to receive the spool 30 and/or leading edge 21 and is formed within outer walls 71. In some examples, the receptacle 72 is configured to attach to the spool 30 to maintain the screen 20 in the extended position across the window frame. One or more mounts provide for securing the mount 70 to the vehicle at the window.

Figure 6:
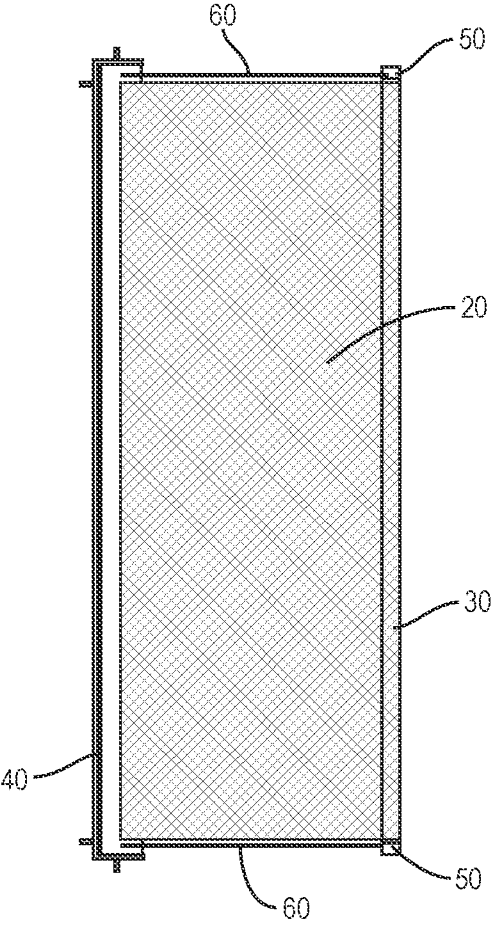
FIG. 6 is a side view of a screen partially deployed and with bands positioned at the upper edge and the lower edge of the screen.

One or more bands 60 provide a force that biases the spool 30 towards the retracted position. FIG. 6 illustrates an example with a pair of bands 60 that provide the biasing force. In this example, the bands 60 are positioned along the top and bottom of the screen 20. Other examples can include different numbers of bands 60 (e.g., one band, three bands, etc.) positioned at various locations along the height of the screen 20.

The bands 60 are configured to apply a biasing force to pull the spool 30 towards the retracted position at the housing 40. In some examples, the bands 60 are elastic and able to stretch as the spool 30 moves towards the extended position. In some examples, the farther the band 60 is stretched, the greater the force that it applies on the spool 30. The bands 60 can be constructed from various materials including but not limited to rubber and nylon.

The bands 60 include an elongated shape with a first end 61 and a second end 62. The first end 61 is mounted to the housing 40 and the second end is operatively mounted to the leading edge 21 of the screen 20. In some examples, the second end is mounted to one of the spool 30 and track members 50. In some examples, the second end is mounted directly to the screen 20. The bands 60 can be connected in various manners, including but not limited to one or more of fasteners and adhesives. In examples with the second end 62 mounted to the spool 30 or the track member 50, these elements rotate such that the one or more bands 60 are rolled onto the member when in the retracted position. In other examples, the one or more bands 60 are not wound onto the element to which they are attached.

In examples with multiple bands 60, the different bands 60 can be attached to the same or different elements.

Figure 7:
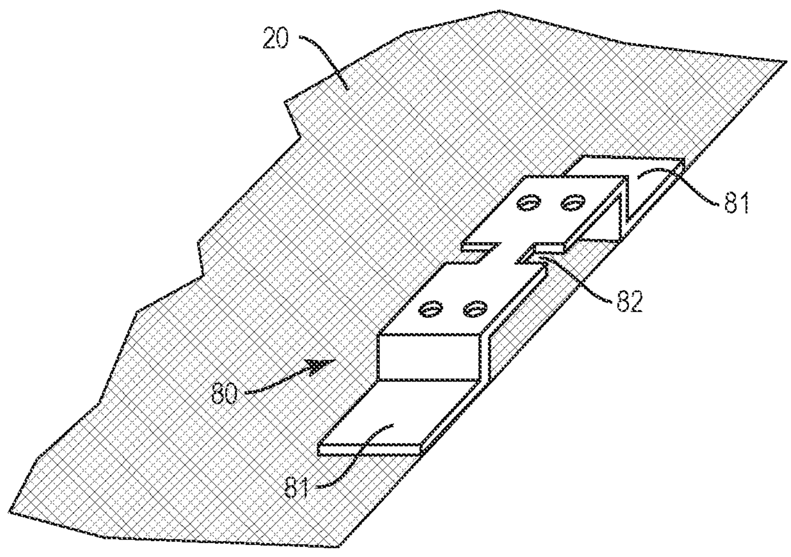
FIG. 7 is a perspective view of a mount configured to be connected to the screen.

In some examples, a handle 80 is mounted to the screen 20 to facilitate movement between the extended and retracted positions. FIG. 7 illustrates an example of a handle 80 that is mounted to the screen 20 at the leading edge 21. The handle 80 include a body with one or more flanges 81 that can contact against and be connected to the screen such as through mechanical fasteners. The handle 80 also includes one or more receivers 82 that are configured to engage with a clip 73 in the mount 70 to secure the screen 20 in the extended position. In one example, one or more of the bands 60 are connected to the handle 80 to apply the biasing force.

Figure 8A:
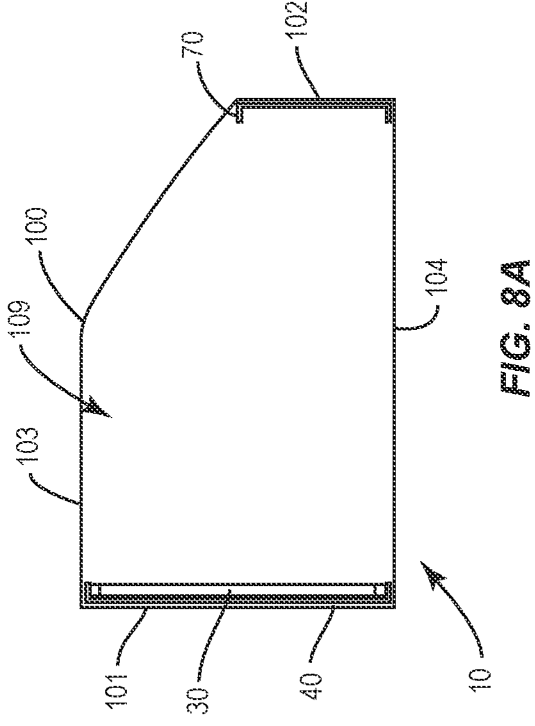
FIGS. 8A-8D are schematic side views of the screen being deployed across a window from a retracted position to an extended position.

FIGS. 8A-8D illustrate an example of the screen system 10 mounted in a window frame 100 of a vehicle window 109. The window frame 100 extends around a portion or entirety of the window 109. As illustrated in FIG. 8A, the housing 40 is mounted at a first edge 101 and mount 70 is mounted at a second edge 102. In some examples, the first edge 101 is the rear edge of a vehicle window 109 and the second edge is the forward edge of the window 109. The spool 30 is positioned vertically in the housing 40 at the first edge 101 such that the window 109 is unobstructed.

Figure 8B:
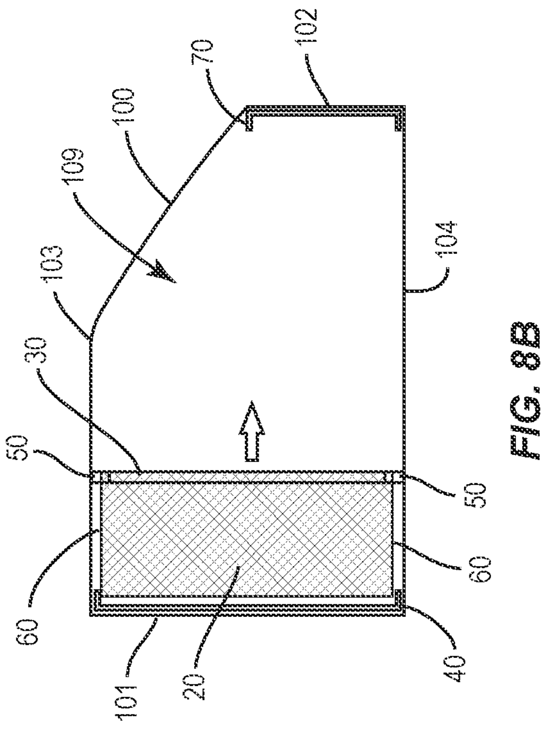

FIG. 8B illustrates the screen 20 partially extended across the window 109. The spool 30 has moved partially into the window 109. In some examples, the track members 50 on the spool 30 contact against the inner edges of the window frame 100. In other examples, the ends of the spool 30 are spaced inward from the window frame 100. In some examples, the spool 30 rotates as it moves across the window 109 thus enabling the screen 20 to unroll. Bands 60 are positioned along the upper and lower edges of the screen 20 and are attached to the spool 30. The bands 60 are exposed in the window 109.

Figure 8C:
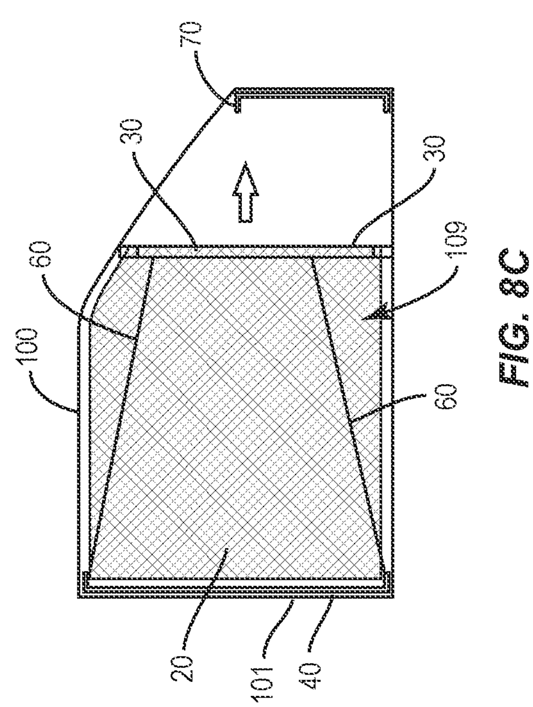

FIG. 8C illustrates the screen 20 extended a greater distance across the window 109. In this example, the track members 50 at the ends of the spool 30 contact against the window frame 100. The tapered shape of the window frame 100 causes the spool 30 to reduce in size to conform to the reduced size with the track members 50 remaining in contact against the inner sides of the window frame 100. The bands 60 that are attached to the spool 30 move inward into the window 109 due to the reduced tapered of the spool 30.

Figure 8D:
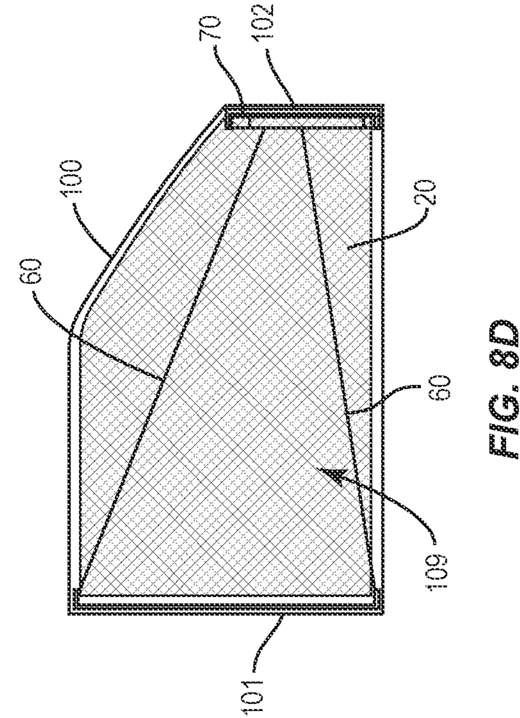

FIG. 8D illustrates the screen 20 in the extended position extending completely across the window 109. The spool 30 is mounted in the mount 70 and secured to maintain the screen 20 in the extended position. The shape of the screen 20 conforms with the shape of the window 109. The bands 60 extend across the window 109 from the housing 40 to the spool 30 that is positioned in the mount 70.

One method of using the screen system 10 includes mounting a trailing edge 22 of the screen 20 to a first edge 101 of the window 109. A force is applied to the screen 20 and overcomes a biasing force applied by one or more bands 60. The force moves a leading edge 21 of the screen 20 across the window 109 with the trailing edge 22 remaining mounted to the first edge 101 of the window 109. The screen 20 is extended across the window 109 and the leading edge 21 of the screen 20 is secured to the second edge 102 of the window 109. One or more bands 60 are extended across the window 109 from the first edge 101 of the window 109 to the second edge 102 of the window 109 and apply a biasing force to the screen 20 to bias the screen towards the first edge 101 of the window 109.

One method of using the screen system 10 includes positioning one or more bands 60 in a housing 40 that is mounted to a first edge 101 of the window 109 with the bands 60 connected to a spool 30. The bands 60 extend from the housing 40 to a spool 30 that supports a screen 20 while moving the spool 30 and the screen 20 across the window 109. A biasing force is applied to the spool 30 while moving the spool 30 and the screen 20 across the window 109 with the biasing force pulls the spool 30 and the screen 20 towards the housing 40. The leading edge 21 of the screen 20 is secured to the second edge 102 of the window 109 while the one or more bands 60 are applying the biasing force to the spool 30. The one or more bands 60 are extended across the window 109 from the first edge 101 to the second edge 102 while the leading edge 21 of the screen 20 is secured to the second edge 102 of the window 109.

The various elements can be connected together using fasteners that include but not limited to one or more adhesives, nails, staples, rivets, and screws.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential properties of the invention. The present embodiments are, therefore, to be considered in all respects as illustrative and not restrictive.

What is claimed is:

1. A screen system for use in a window of a vehicle, the screen system comprising:

a screen comprising a leading edge and a trailing edge;

a spool mounted to the leading edge of the screen, wherein the spool comprises track members mounted to ends of the spool and with the track members comprising rollers configured to engage with a frame of the window;

a housing configured to be mounted at a first edge of the window;

one or more bands that are operatively connected to the track members and configured to apply a biasing force to the screen, the one or more bands being elastic;

the screen movable between a retracted position and an extended position;

wherein the retracted position comprises the screen rolled onto the spool with the screen and the spool positioned in the housing at the first edge of the window;

wherein the extended position comprises the screen extending across the window with the leading edge positioned at a second edge of the window and the first edge positioned at the first edge of the window and with the one or more bands extending across the window and applying the biasing force to the screen.

2. The screen system of claim 1, wherein the one or more bands comprise a first end that is connected to the housing and a second end that is connected to one of the track members.

3. The screen system of claim 2, wherein the one or more bands are wrapped around the spool when the screen is in the retracted position.

4. The screen system of claim 1, wherein second ends of the one or more bands are connected to the track members that are mounted to the ends of the spool.

5. The screen system of claim 1, wherein a first one of the bands is positioned at an upper edge of the screen and a second one of the bands is positioned at a lower edge of the screen.

6. The screen system of claim 1, wherein the spool comprises:

an inner member;

an outer member that extends around the inner member;

a biasing member that applies a biasing force that forces the inner member and outer member apart; and wherein the inner member and the outer member are telescopingly engaged.

7. The screen system of claim 1, further comprising a mount configured to be mounted at the second edge of the window with the spool configured to connect to the mount in the extended position to maintain the screen positioned across the window.

8. A method of using a screen system with a window of a vehicle, the method comprising:

mounting a trailing edge of the screen to a first edge of the window and with a leading edge of the screen connected to a spool;

securing one or more bands at the first edge of the window and to track members that are connected to the spool;

applying a force to the screen and overcoming a biasing force applied by the one or more bands and moving the leading edge of the screen and the spool across the window with the trailing edge remaining mounted to the first edge of the window;

extending the screen across the window and securing the leading edge of the screen to a second edge of the window; and extending the one or more bands across the window from the first edge of the window to the second edge of the window and applying a biasing force to the screen to bias the screen towards the first edge of the window.

9. The method of claim 8, further comprising increasing the biasing force applied by the one or more bands as the leading edge moves across the window towards the second edge of the window.

10. The method of claim 8, further comprising mounting the trailing edge of the screen to a housing that is mounted at the first edge of the window.

11. The method of claim 8, further comprising unrolling the screen from the spool that is attached to the leading edge of the screen while moving the leading edge across the window towards the second edge.

12. The method of claim 11, further comprising contacting the track members against opposing sides of the window while moving the leading edge of the screen across the window.

13. The method of claim 12, further comprising reducing a length of the spool while moving the spool across the window towards the second edge of the window.

14. The method of claim 8, further comprising securing the leading edge of the screen to the second edge of the window and filling an entirety of the window with the screen.

15. A method of using a screen system with a window of a vehicle, the method comprising:

positioning one or more bands in a housing that is mounted to a first edge of the window with the one or more bands connected to track members that are mounted to ends of a spool;

extending the one or more bands that extend from the housing to the track members while moving the spool and the screen across the window;

applying a biasing force to the spool through the one or more bands while moving the spool and the screen across the window with the biasing force pulling the spool and the screen towards the housing;

securing a leading edge of the screen to a second edge of the window while the one or more bands are applying the biasing force; and extending the one or more bands across the window from the first edge of the window to the second edge of the window while the leading edge of the screen is secured to the second edge of the window.

16. The method of claim 15, further comprising unrolling the one or more bands from around the spool while moving the spool across the window.

17. The method of claim 15, further comprising positioning the spool in an end housing at the second edge of the window and thereby securing the leading edge of the screen to the second edge of the window.

18. The method of claim 15, further comprising reducing a height of the spool while moving the spool across the window.

* * * * *